US012424058B2

(12) United States Patent
Marks

(10) Patent No.: US 12,424,058 B2
(45) Date of Patent: Sep. 23, 2025

(54) SYSTEMS AND METHODS FOR PROVIDING PERSISTENT OUTPUTS IN ELECTRONIC GAMING

(71) Applicant: Aristocrat Technologies, Inc., Las Vegas, NV (US)

(72) Inventor: Daniel Marks, Decatur, GA (US)

(73) Assignee: Aristocrat Technologies, Inc., Las Vegas, NV (US)

(*) Notice: Subject to any disclaimer, the term of this patent is extended or adjusted under 35 U.S.C. 154(b) by 332 days.

(21) Appl. No.: 17/957,716

(22) Filed: Sep. 30, 2022

(65) Prior Publication Data

US 2024/0112543 A1 Apr. 4, 2024

(51) Int. Cl.
*G07F 17/32* (2006.01)
*G07F 17/34* (2006.01)

(52) U.S. Cl.
CPC ...... *G07F 17/3267* (2013.01); *G07F 17/3211* (2013.01); *G07F 17/34* (2013.01)

(58) Field of Classification Search
CPC ... G07F 17/3267; G07F 17/3211; G07F 17/34
See application file for complete search history.

(56) References Cited

U.S. PATENT DOCUMENTS 5,833,537 A * 11/1998 Barrie ................ G07F 17/3265 D21/370
6,095,921 A 8/2000 Walker
6,120,031 A * 9/2000 Adams ................ G07F 17/3244 273/306
6,146,273 A 11/2000 Olsen
6,905,407 B2 6/2005 Nordman
7,753,778 B2 7/2010 Kato
8,342,945 B2 1/2013 Gomez
8,684,808 B2 * 4/2014 Aoki .................. G07F 17/3267 463/13
9,972,171 B2 5/2018 Marston
10,102,711 B2 10/2018 Zoltewicz
10,607,439 B2 * 3/2020 Caputo ............... G07F 17/3213
(Continued)

OTHER PUBLICATIONS

Office Action (Non-Final Rejection) dated Mar. 23, 2022 for U.S. Appl. No. 17/341,750 (pp. 1-15).
(Continued)

*Primary Examiner* — Reginald A Renwick
(74) *Attorney, Agent, or Firm* — Armstrong Teasdale LLP

(57) ABSTRACT

An electronic gaming system including processor in communication with a memory with instructions stored thereon is described. The instructions cause the processor to cause display of an electronic game including a plurality of reels, a plurality of persistent win positions, and a timer, and cause the timer to incrementally transition between a first time and a second time. As spins of the plurality of reels occur, the instructions also cause the processor to identify any trigger symbols, for game outcomes that include at least one trigger symbol, cause a respective output amount associated with a respective at least one trigger symbol to be displayed, for game outcomes that do not include at least one trigger symbol, cause the plurality of persistent win positions to be cleared, and when a predetermined number of positions of the plurality of persistent win positions include output amounts, cause the output amounts to be awarded.

20 Claims, 18 Drawing Sheets

(56) References Cited

U.S. PATENT DOCUMENTS

| | | | | |
|---|---|---|---|---|
| 10,769,882 | B2 | 9/2020 | Uss | |
| 10,796,528 | B2 | 10/2020 | Bridges | |
| 11,551,527 | B2 | 1/2023 | Cohn | |
| 2003/0216165 | A1 * | 11/2003 | Singer | G07F 17/3211 463/20 |
| 2004/0077395 | A1 | 4/2004 | Tuhy | |
| 2004/0102238 | A1 | 5/2004 | Taylor | |
| 2004/0127282 | A1 | 7/2004 | Naobayashi | |
| 2004/0229700 | A1 | 11/2004 | Cannon | |
| 2006/0025203 | A1 | 2/2006 | Thomas | |
| 2006/0068893 | A1 * | 3/2006 | Jaffe | G07F 17/3244 463/20 |
| 2008/0153577 | A1 | 6/2008 | Seelig | |
| 2008/0311973 | A1 | 12/2008 | Jaffe | |
| 2011/0111826 | A1 | 5/2011 | Baerlocher | |
| 2012/0108324 | A1 | 5/2012 | King | |
| 2012/0115565 | A1 * | 5/2012 | Schwerdling | G07F 17/3267 463/20 |
| 2014/0287812 | A1 | 9/2014 | Friedman | |
| 2018/0204422 | A1 | 7/2018 | Berman | |
| 2018/0293847 | A1 | 10/2018 | Hendricks | |
| 2019/0311571 | A1 | 10/2019 | Halvorson | |
| 2019/0340886 | A1 * | 11/2019 | Humphrey | G07F 17/3293 |
| 2020/0074784 | A1 | 3/2020 | Caputo | |
| 2020/0294367 | A1 | 9/2020 | Crispino | |
| 2020/0364974 | A1 | 11/2020 | Marks | |
| 2023/0154286 | A1 * | 5/2023 | Warms | G07F 17/34 463/20 |
| 2023/0267808 | A1 * | 8/2023 | Bouvier | G07F 17/3244 463/20 |

OTHER PUBLICATIONS

Office Action (Notice of Allowance and Fees Due (PTOL-85) dated Sep. 23, 2022 for U.S. Appl. No. 17/341,750 (pp. 1-7).

Office Action (Notice of Allowance and Fees Due (PTOL-85)) dated Oct. 6, 2022 for U.S. Appl. No. 17/341,750 (pp. 1-4).

Office Action dated May 27, 2022 for U.S. Appl. No. 17/449,633 (pp. 1-11).

Office Action dated Oct. 6, 2022 for U.S. Appl. No. 17/449,633 (pp. 1-21).

Notice of Allowance dated Apr. 4, 2023 for U.S. Appl. No. 18/066,125 (pp. 1-8).

Office Action (Notice of Allowance and Fees Due (PTOL-85)) dated Jun. 14, 2023 for U.S. Appl. No. 17/449,633 (pp. 1-19).

Office Action (Notice of Allowance and Fees Due (PTOL-85)) dated Aug. 29, 2023 for U.S. Appl. No. 17/449,633 (pp. 1-2).

Office Action (Notice of Allowance and Fees Due (PTOL-85)) dated Oct. 12, 2023 for U.S. Appl. No. 17/449,633 (pp. 1-2).

Notice of Allowance dated Apr. 2, 2024 for U.S. Appl. No. 18/336,619 (pp. 1-11).

* cited by examiner

SYSTEMS AND METHODS FOR PROVIDING PERSISTENT OUTPUTS IN ELECTRONIC GAMING

TECHNICAL FIELD

The field of disclosure relates generally to electronic gaming, and more specifically, to systems and methods for providing persistent outputs in electronic gaming.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

BRIEF DESCRIPTION

In one aspect, an electronic gaming system is described. The electronic gaming system includes at least one memory with instructions stored thereon and at least one processor in communication with the at least one memory. The instructions, when executed by the at least one processor, cause the at least one processor to cause display of an electronic game including a first display area including a plurality of reels, each reel including a plurality of symbols, in response to a trigger condition, transition display of the electronic game to include a second display area including a plurality of persistent win positions and a third display area including a timer and cause the timer to incrementally transition between a first time and a second time. For each spin of a plurality of spins that occur as the timer incrementally transitions between the first time and the second time, the instructions also cause the at least one processor to identify any trigger symbols that are caused to be displayed in the first display area, for game outcomes that include at least one trigger symbol, cause a respective output amount associated with a respective at least one trigger symbol to be displayed in a position of the plurality of persistent win positions not currently displaying an output amount, for game outcomes that do not include at least one trigger symbol, cause the plurality of persistent win positions to be cleared, and when a predetermined number of positions of the plurality of persistent win positions include output amounts, cause the output amounts to be awarded.

In another aspect, an electronic gaming device is described. The electronic gaming device includes at least one memory with instructions stored thereon and at least one processor in communication with the at least one memory. The instructions, when executed by the at least one processor, cause the at least one processor to cause display of an electronic game including a first display area including a plurality of reels, each reel including a plurality of symbols, in response to a trigger condition, transition display of the electronic game to include a second display area including a plurality of persistent win positions and a third display area including a timer and cause the timer to incrementally transition between a first time and a second time. For each spin of a plurality of spins that occur as the timer incrementally transitions between the first time and the second time, the instructions further cause the at least one processor to identify any trigger symbols that are caused to be displayed in the first display area, for game outcomes that include at least one trigger symbol, cause a respective output amount associated with a respective at least one trigger symbol to be displayed in a position of the plurality of persistent win positions not currently displaying an output amount, for game outcomes that do not include at least one trigger symbol, cause the plurality of persistent win positions to be cleared, and when a predetermined number of positions of the plurality of persistent win positions include output amounts, cause the output amounts to be awarded.

In yet another aspect, at least one non-transitory computer-readable storage medium with instructions stored thereon is described. The instructions, when executed by at least one processor, cause the at least one processor to cause display of an electronic game including a first display area including a plurality of reels, each reel including a plurality of symbols, in response to a trigger condition, transition display of the electronic game to include a second display area including a plurality of persistent win positions and a third display area including a timer and cause the timer to incrementally transition between a first time and a second time. For each spin of a plurality of spins that occur as the timer incrementally transitions between the first time and the second time, the instructions further cause the at least one processor to identify any trigger symbols that are caused to be displayed in the first display area, for game outcomes that include at least one trigger symbol, cause a respective output amount associated with a respective at least one trigger symbol to be displayed in a position of the plurality of persistent win positions not currently displaying an output amount, for game outcomes that do not include at least one trigger symbol, cause the plurality of persistent win positions to be cleared, and when a predetermined number of positions of the plurality of persistent win positions include output amounts, cause the output amounts to be awarded.

DETAILED DESCRIPTION

Figure 1:
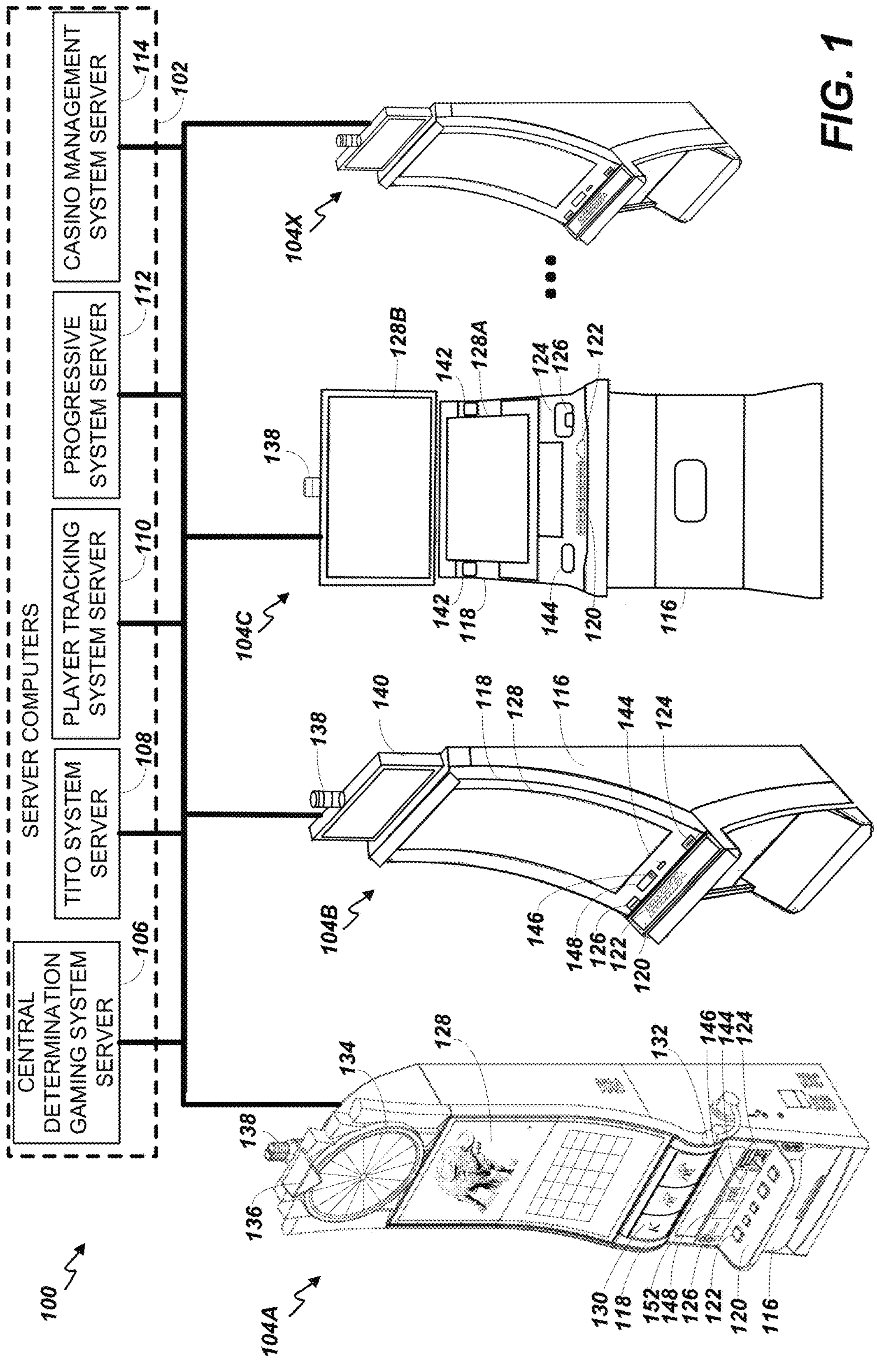
FIG. 1 is an exemplary diagram showing several EGMs networked with various gaming related servers.

In the example embodiment, an electronic game is described with a two-minute drill feature. For example, the two-minute drill feature may be triggered across a plurality of electronic gaming machines (EGMs). Then, for the next two minutes, the feature game is presented (e.g., before returning to a base game). For each spin of reels in the feature game, the output amounts associated with any cash on reel (COR) symbols presented (e.g., symbols with an output amount displayed thereon) for a respective spin are summed and added to a segment of a display area as a persistent win. Then, if a next spin includes COR symbols, the output amounts are summed and added to a next segment of the display area (e.g., and so forth). If four consecutive spins include COR symbols (e.g., and thus all four segments of the display area include output amounts), those output amounts are presented. However, if a spin does not include COR symbols, each segment of the display area is cleared (e.g., the segments are reset).

For example, an electronic game is provided including display of a plurality of reels and a plurality of persistent win positions. Upon a game outcome including one or more trigger symbols (e.g., cash on reels (COR) symbols), output amounts associated with the one or more trigger symbols are summed. The sum of the one or more output amounts is added to a previously empty position of the plurality of persistent win positions. Upon each position of the plurality of persistent win positions being filled with an output amount, the sum of the output amounts is presented. However, in the example embodiment, upon a game outcome that does not include one or more trigger symbols, the plurality of persistent win positions are cleared of all output amounts. Further, in the example embodiment the electronic game is a timed game such that in order to win the sum of the output amounts, the plurality of persistent win positions needs to be filled within a predetermined amount of time before the game ends.

In other words, an electronic gaming system causes display of an electronic game that includes a first display area including a plurality of reels, a second display area including a plurality of persistent win positions, and a third display area including a timer. The timer incrementally transitions between a first time and a second time (e.g., a countdown from a predetermined time to zero). As the timer counts down, spins of the plurality of reels occur to produce game outcomes (e.g., as the player selects a spin button).

For each spin, any trigger symbols displayed in the first display area are identified. For game outcomes that include at least one trigger symbol, a respective output amount associated with the respective at least one trigger symbol is displayed in a position of the plurality of persistent win positions not currently displaying an output amount. For game outcomes that do not include at least one trigger symbol, the plurality of persistent win positions are cleared. In some embodiments, for each game outcome that does not include at least one trigger symbol, only a single and/or a predetermined number of persistent win positions are cleared. Further, when a predetermined number of positions of the plurality of persistent win positions include output amounts, a sum of the output amounts in the number of positions is awarded.

In some embodiments, the electronic game is initiated based on the occurrence of a trigger condition (e.g., a randomly determined time, a trigger in a different electronic game, a trigger in a stored schedule, a player action, etc.). The electronic game described herein may also be triggered at a plurality of electronic gaming devices at the same time for a predetermined period of time, based on individual triggers at each device or a common trigger that initiates the feature or electronic game simultaneously. For example, the example embodiment described herein includes a "two minute drill" football theme including a timer counting down from two minutes to zero (e.g., in football, a two minute drill refers to a team's offense having the ball with less than two minutes to go in a half—and trying to rush to score before those two minutes of game time are completed and halftime and/or the end of the game occurs).

In some embodiments, an animation is caused to be displayed between one or more symbol positions including one or more trigger symbols and a position of the plurality of persistent win positions not currently displaying an output amount. For example, if four trigger symbols are displayed, an animation may be displayed as respectively extending between the four symbols positions including the four trigger symbols to the position of the plurality of persistent win positions that the sum of the output amounts associated with the four trigger symbols will be displayed in (e.g., to attract player attention to the respective position of the plurality of persistent win positions). In some embodiments, an animation may be displayed adjacent each position of the plurality of persistent win positions with an output amount displayed therein to indicate the number of persistent win positions with output amounts therein (e.g., to further communicate how close the game is to completing each position of the number of persistent win positions with output amounts, and therefore the player being awarded the sum of the output amounts).

In some embodiments, a video is displayed in a third display area and is associated with a historical event. For instance, continuing the above example, a video of a football game may be displayed (e.g., a team running plays in a two-minute drill, as described above). Notably, it should be appreciated that while a two-minute drill football theme is described with respect to the example embodiment herein, any number of themes are envisioned. For example, themes associated with different or no time periods are envisioned.

As another example, in some embodiments, credit amounts are not added to the plurality of persistent win positions. Rather, a number of scatter symbols displayed in each respective game outcome may be summed and added to an empty position of the plurality of persistent win positions (e.g., if one or more scatter symbols are displayed). Upon achieving four game outcomes in a row each including one or more scatter symbols, the number of scatter symbols that appeared in the four games (e.g., and are shown in the plurality of persistent win positions) may be added and compared against a stored paytable to determine an output amount.

Certain technical problems arise when implementing persistent outputs in electronic gaming, as described herein. For example, information needs to be communicated clearly and/or on screens of limited size. Further, certain game data needs to be modified in order to ensure a game will remain in the feature game (e.g., a bonus game being triggered during a timed feature game would cause problem with controlling return to player (RTP) and providing a synchronized community experience across a plurality of gaming devices).

Accordingly, technical solutions are described herein to address at least the technical problems described above. For example, a plurality of animations are described herein as providing an improved display experience so that the output amounts being added to a persistent win position are clearly displayed and so that a number of persistent win positions with output amounts therein are clearly displayed (e.g., and therefore progress toward being presented the sum of the output amounts). Further, in some embodiments certain symbols are removed from reels when the feature game is triggered (e.g., to prevent triggering of a different bonus game during play of the feature game) and certain symbols are added to the reels (e.g., additional COR symbols to provide a better chance at filling the persistent win positions). Additionally, different areas in memory may be associated with each respective persistent win position/display area to provide efficient storage and/or clearing of output amounts from each persistent win position.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
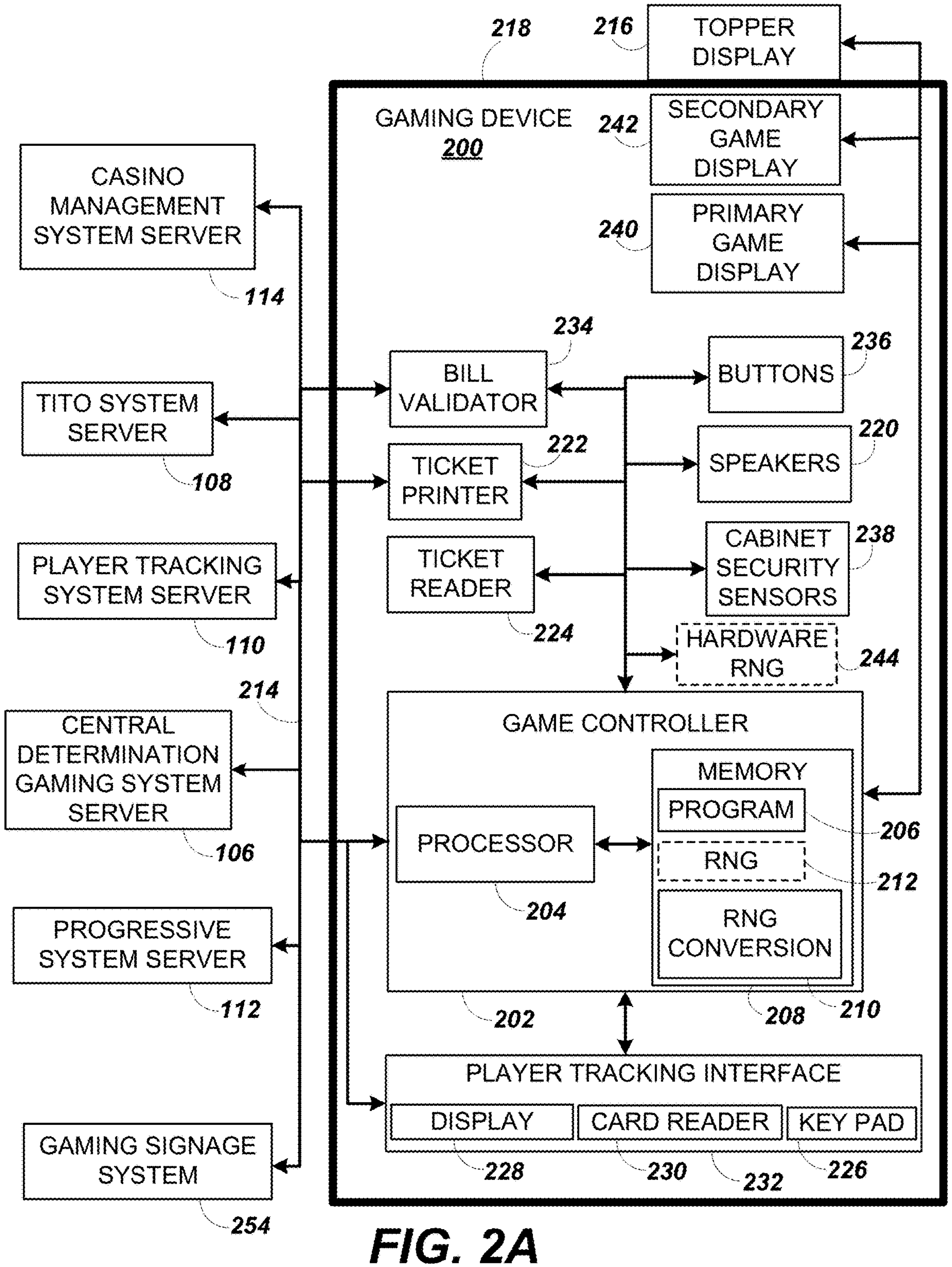
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helixm™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
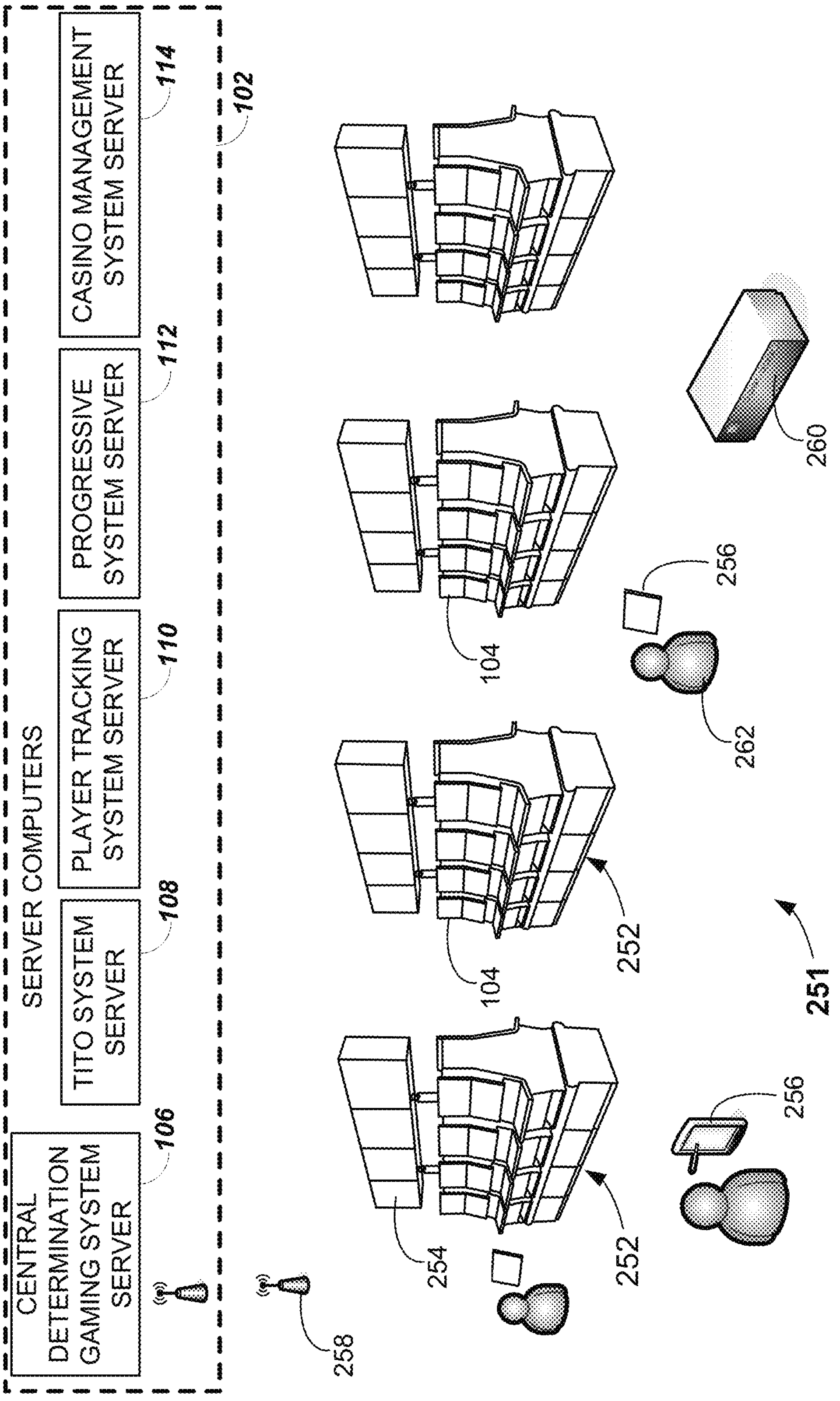
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor (s) to verify the identity of an authorized patron. Some mobile gaming devices 256 may be configured to function only within a predetermined or configurable area, such as a casino gaming area.

Figure 2C:
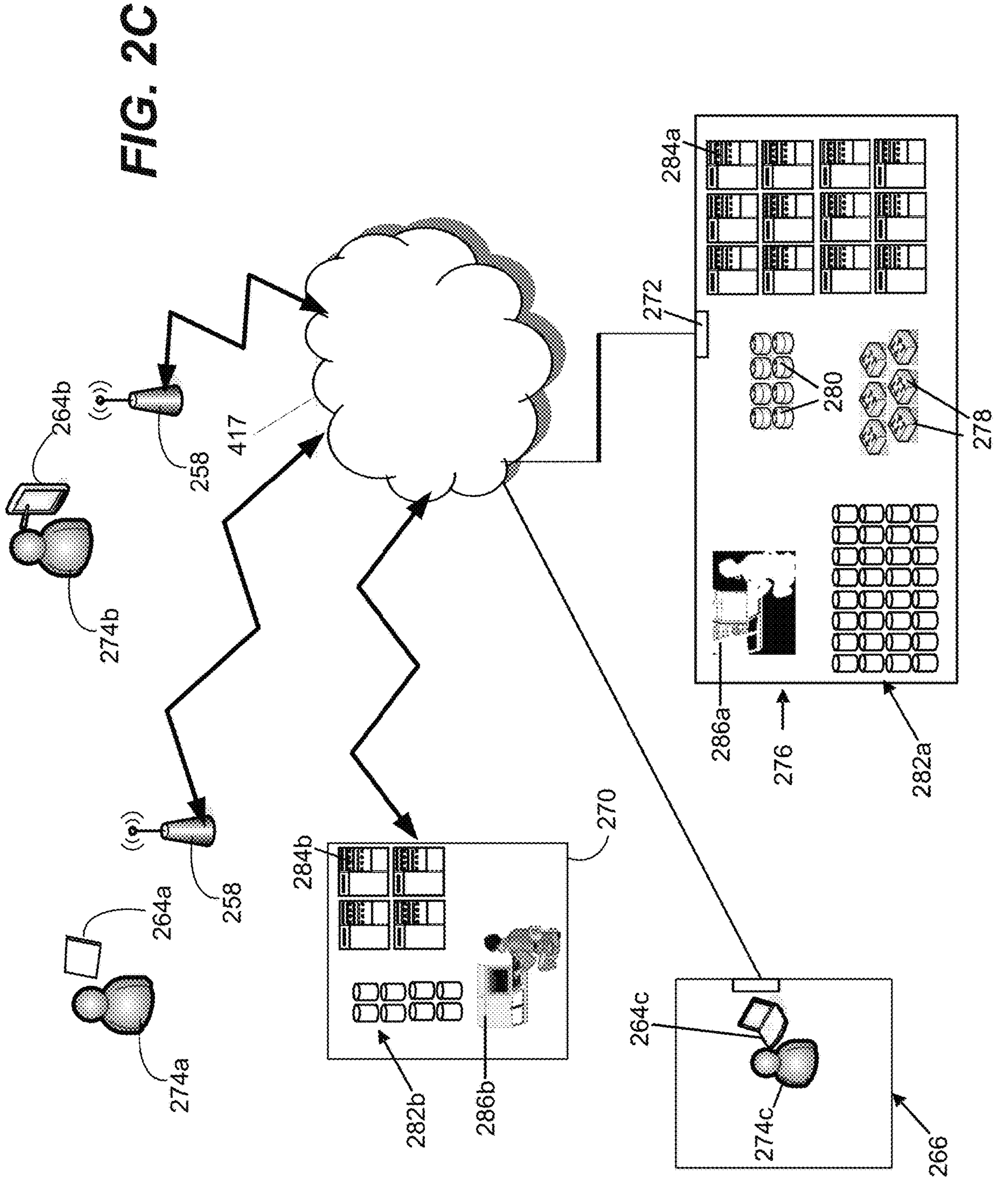
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 286*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server (s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
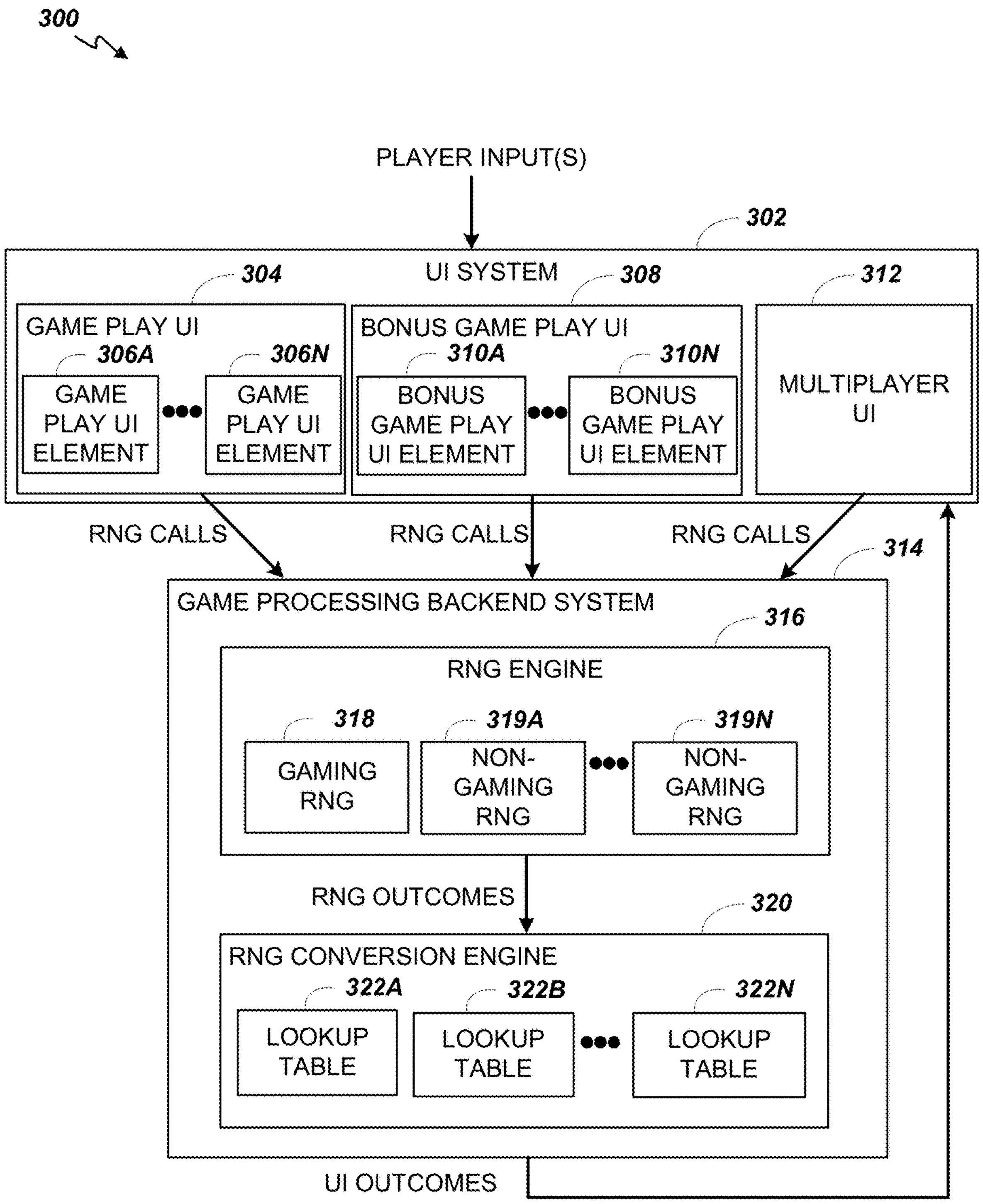
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4:
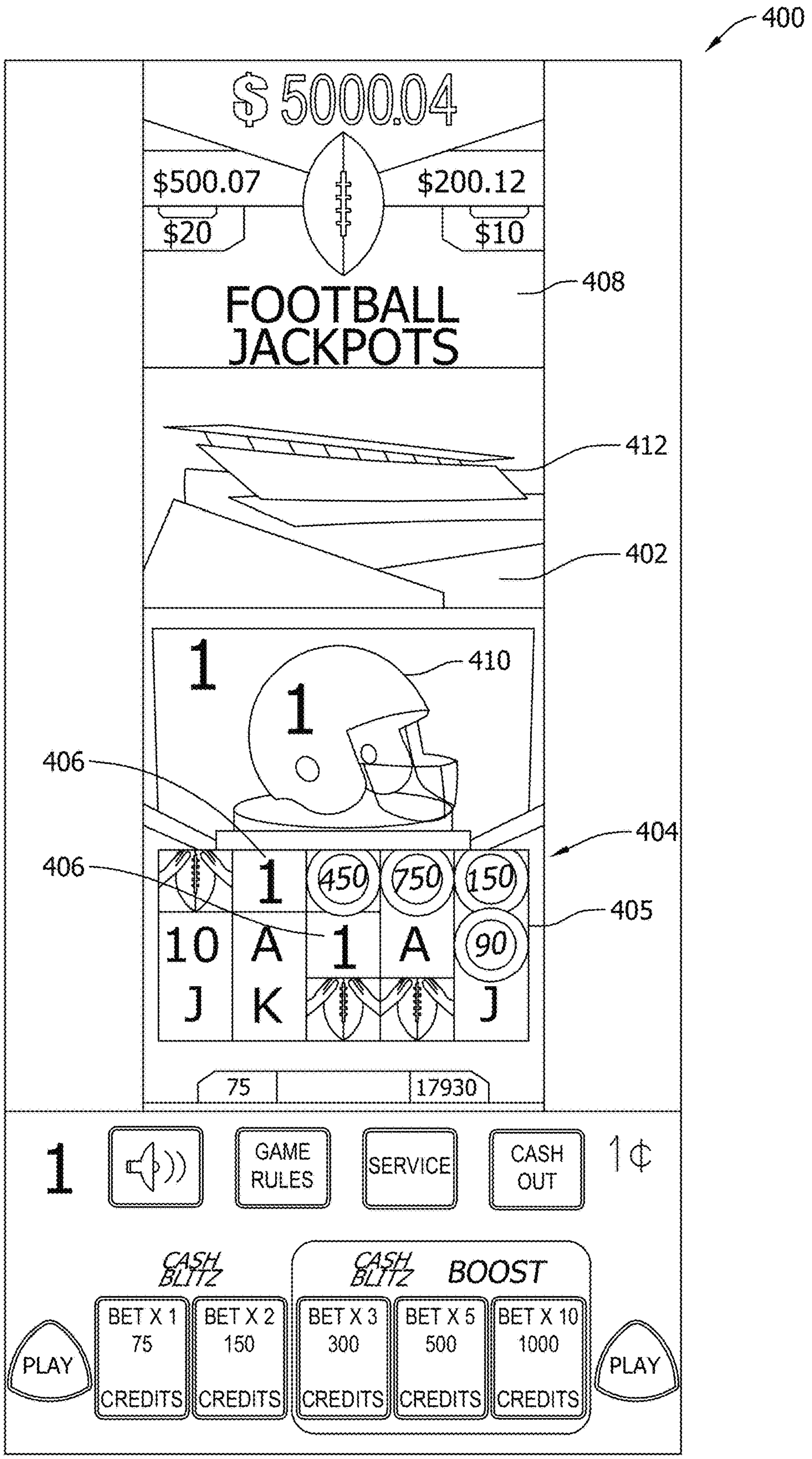
FIG. 4 is an example screenshot in a sequence illustrating providing persistent outputs in electronic gaming, in accordance with the present disclosure.

FIG. 4 is an example screenshot 400 in a sequence illustrating providing persistent outputs in electronic gaming, in accordance with the present disclosure. For example, the sequence shown in FIGS. 4-13, the examples shown in FIGS. 14 and 15, and the method shown in FIG. 16 may be implemented by any of the gaming devices (e.g., 104A-X, 200, 256, 264*a-c*), systems, and/or architectures described herein.

As shown in FIG. 4, screenshot 400 illustrates a display device 402 including a first display area 404 with a plurality of reels 405 therein (e.g., including theme symbols 406 associated with a selected game theme). A second display area 408 includes an indicator 410 of the selected game theme and a looping video 412 associated with the selected game theme (e.g., a player may select a game theme and/or the theme may be predetermined by a casino operator, for example). Further, screenshot 400 includes a third display area 414 including a plurality of jackpots available to be won.

Notably, screenshot 400 illustrates an electronic game before the feature game (e.g., the two-minute drill feature game) described herein is triggered. In the example embodiment, the feature game is determined to initiate at random times (e.g., based on one or more RNG calls/outputs and/or a lookup table). In some embodiments, the feature game may be triggered based on any trigger (e.g., a predetermined time, based on a game outcome, etc.). Further, in the example embodiment the feature game is initiated on a plurality of gaming devices (e.g., a bank of EGMs) at the same time such that each gaming device of the plurality of gaming devices participates in the feature game at the same time and for the same amount of time. In various embodiments, a central controller such as progressive system server 112 communicates with the plurality of gaming devices to initiate the feature. Progressive system server 112 contains logic to determine when to trigger the feature based on activity received from the plurality of gaming devices. For example, each gaming device may communicate state information, such as wager, outcome, game events to progressive system server 112. In addition, progressive system server 112 may maintain an internal timer that is used to trigger the feature in predetermined or randomly determined time intervals.

Figure 5:
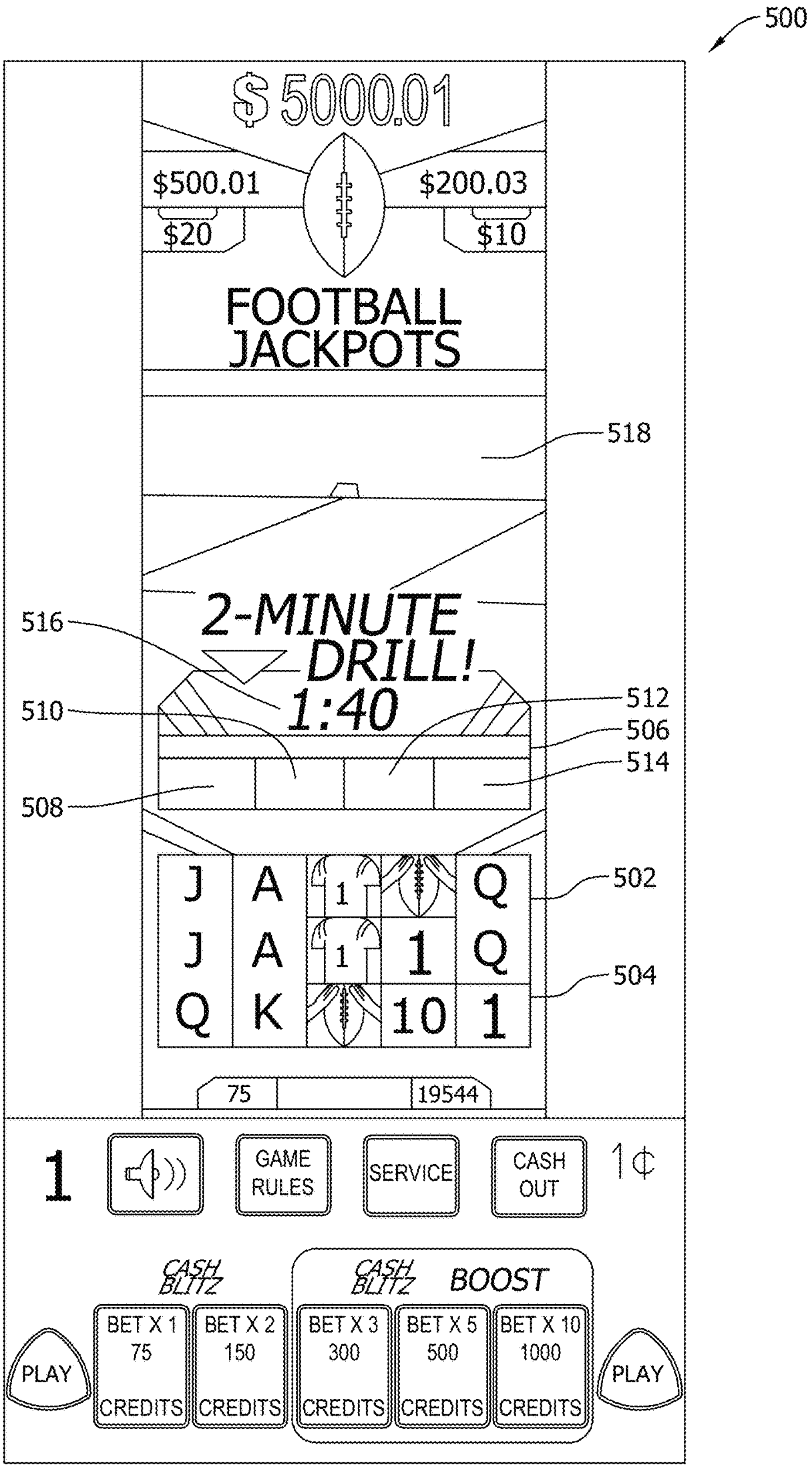
FIG. 5 is a next example screenshot in the sequence illustrating providing persistent outputs in electronic gaming, continuing the example shown in FIG. 4.

FIG. 5 is a next example screenshot 500 in the sequence for illustrating providing persistent outputs in electronic gaming, continuing the example shown in FIG. 4. For example, FIG. 5 illustrates a state of the feature game described herein after twenty seconds have passed during play of the feature game (e.g., thus, 1:40 of the 2:00 feature game remain). As shown in FIG. 5, screenshot 500 includes device 402 displaying the feature game. The feature game includes a first display area 502 including a plurality of reels 504. In some embodiments, reels 504 may be the same as reels 405. In some embodiments, reels 504 may be different from reels 405 to better suit the feature game. For example, reels 504 may include more trigger symbols (e.g., cash on reels (COR) symbols, with output amounts displayed thereon) to provide a better chance for game outcomes that cause an output amount to be added to one of a plurality of persistent win positions. In some embodiments, certain symbols may be removed from reels 405 to generate reels 504, such as symbols that may trigger an alternate bonus game (e.g., no bonus game should be triggered during the timed feature game, for example).

Screenshot 500 also includes a second display area 506 plurality of persistent win positions 508, 510, 512, 514. A timer 516 is also displayed, indicating an amount of time remaining in the feature game (e.g., in this example, twenty seconds of the two minutes has already passed, leaving one minute and forty seconds remaining). Further a video of a historical event is displayed in a third display area 518 (e.g., a video of a football game where a team is attempting to complete a two minute drill and/or a team corresponding to a theme of the game). In some embodiments, the feature game is played with paid spins (e.g., a player credit input is required for each spin). In some embodiments, the feature game is played with free spins (e.g., spins that require no separate input amount) and/or a combination of paid spins and free spins.

Figure 6:
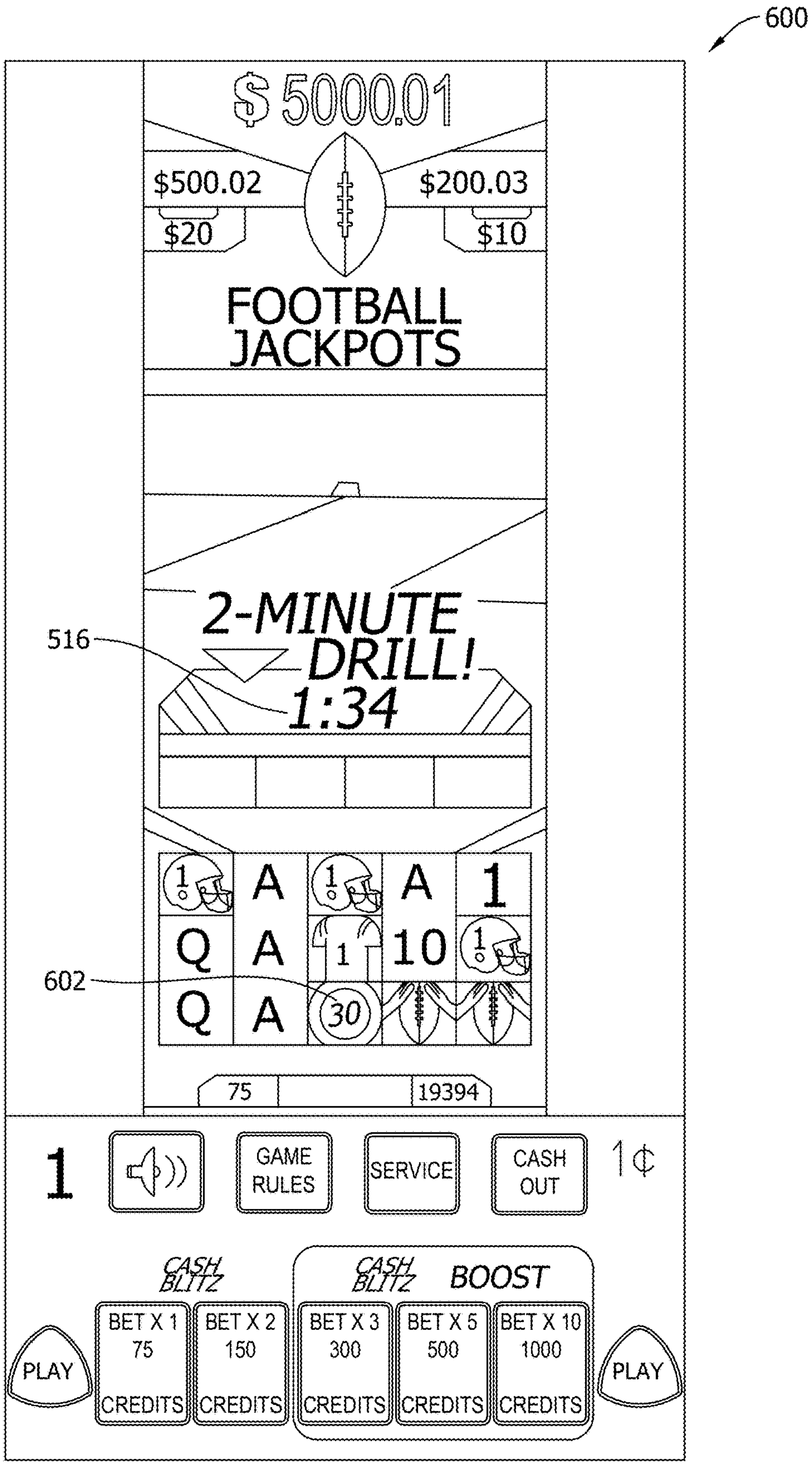
FIG. 6 is a next example screenshot in the sequence illustrating providing persistent outputs in electronic gaming, continuing the example shown in FIG. 5.
Figure 7:
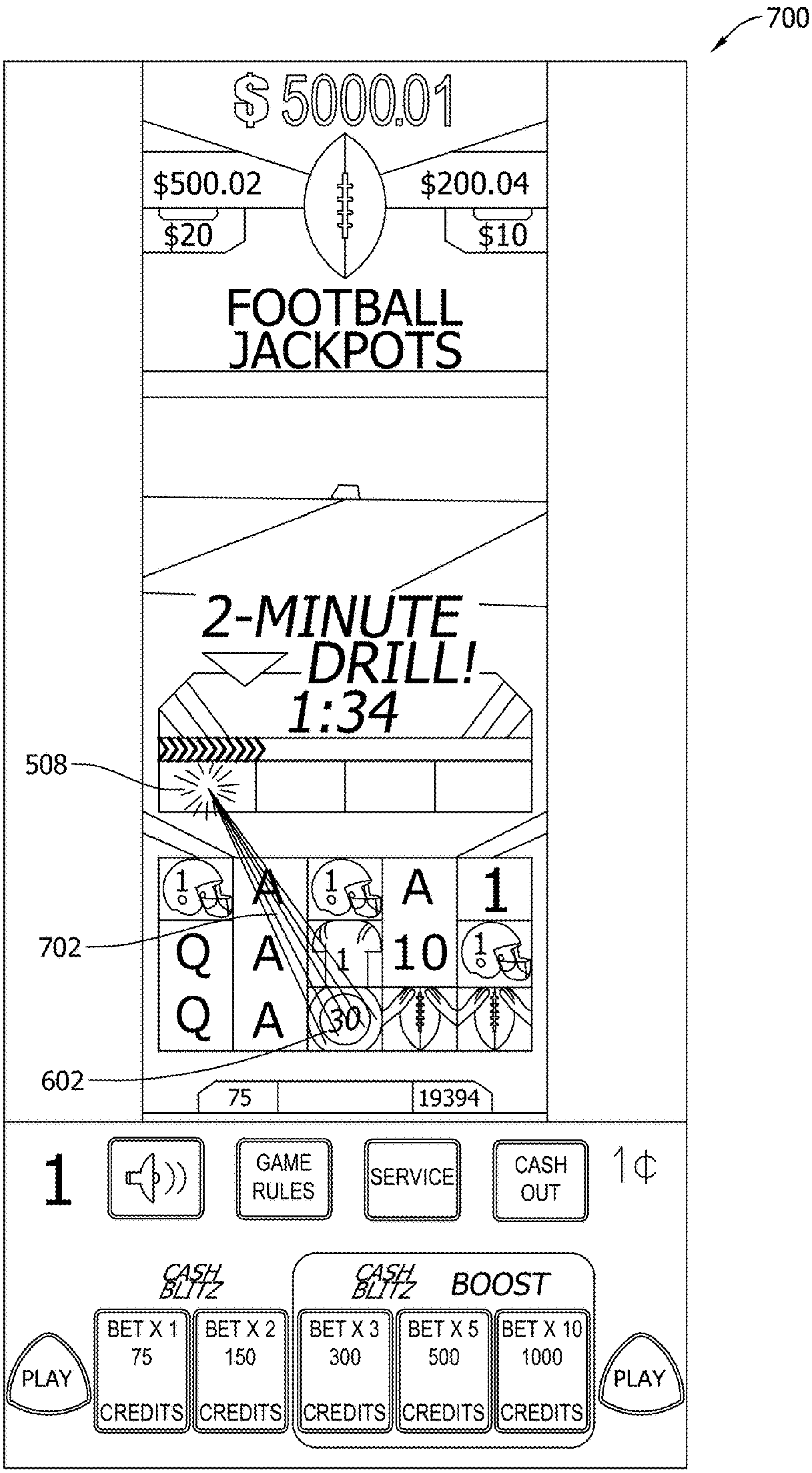
FIG. 7 is a next example screenshot in the sequence illustrating providing persistent outputs in electronic gaming, continuing the example shown in FIG. 6.

FIG. 6 is a next example screenshot 600 in the sequence for illustrating providing persistent outputs in electronic gaming, continuing the example shown in FIG. 5. As shown in screenshot 600, timer 516 indicates six seconds have passed since screenshot 500 and a COR symbol 602 is displayed. COR symbol triggers an addition of an output amount associated with COR symbol 602 to win position 508. Accordingly, as shown in screenshot 700 of FIG. 7, an animation 702 is displayed as extending between COR symbol 602 (e.g., a symbol position including COR symbol 602) and win position 508 where an output amount associated with COR symbol 602, in this example 30 credits, will be added. In the example embodiment, when more than one COR symbol is displayed, animations may extend between all symbol positions with COR symbols displayed thereon and a corresponding win position where the summation of output amounts associated with the COR symbols will be added. Although animation 702 is not shown in the figures with respect to each output amount being added to a win position 508-514, it should be appreciated that an animation (e.g., animation 702) may be displayed when an output amount is added to a win position 508-514.

Figure 8:
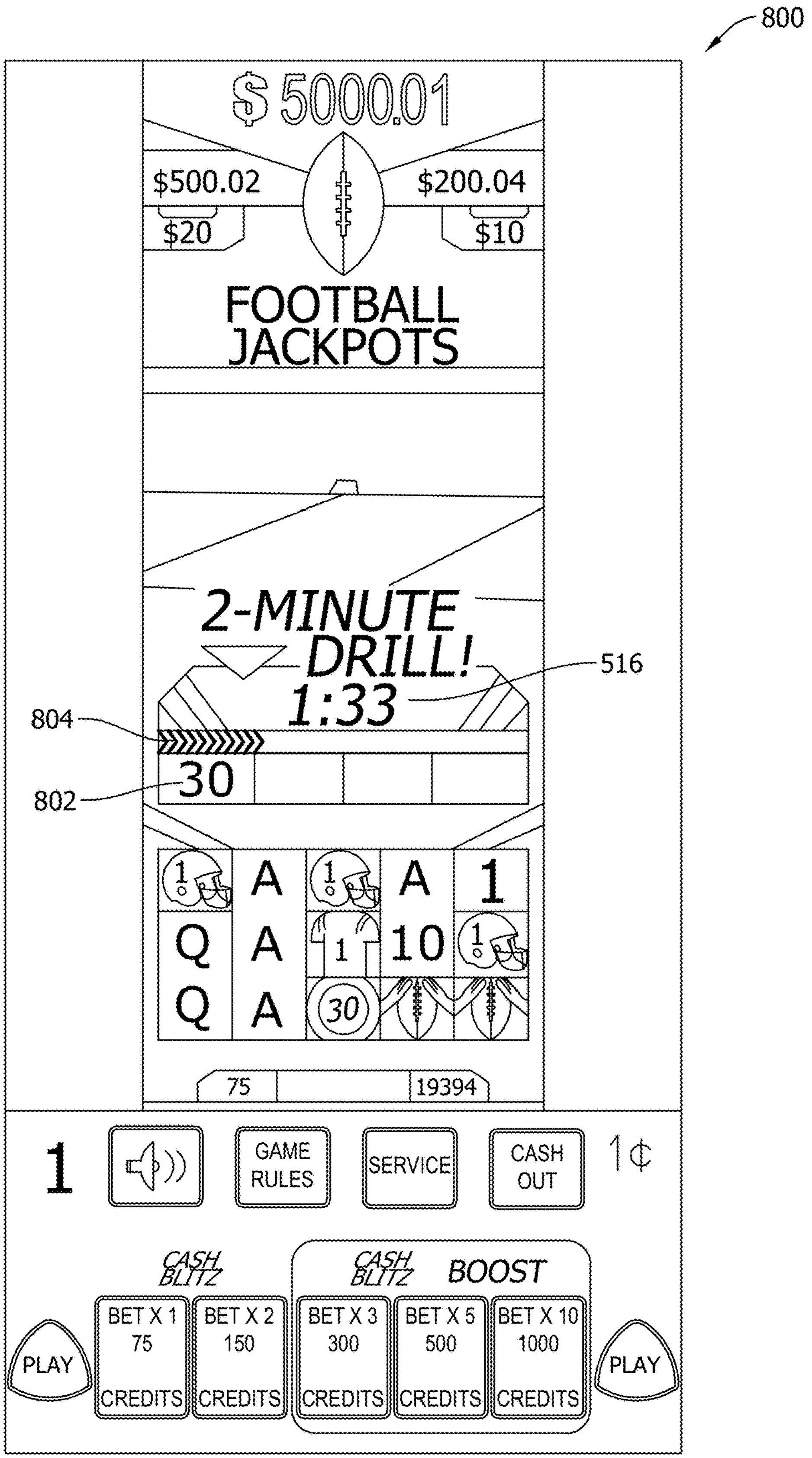
FIG. 8 is a next example screenshot in the sequence illustrating providing persistent outputs in electronic gaming, continuing the example shown in FIG. 7.

Then, as shown in screenshot 800 of FIG. 8, output amount 802 is displayed in win position 508 and timer 516 shows an updated time. Further an animation 804 (e.g., arrows pointing the direction in which win positions 508-514 will be filled in) is displayed adjacent win position 508 to indicate that win position 508 includes an output amount to help attract player attention to win position 508.

Figure 9:
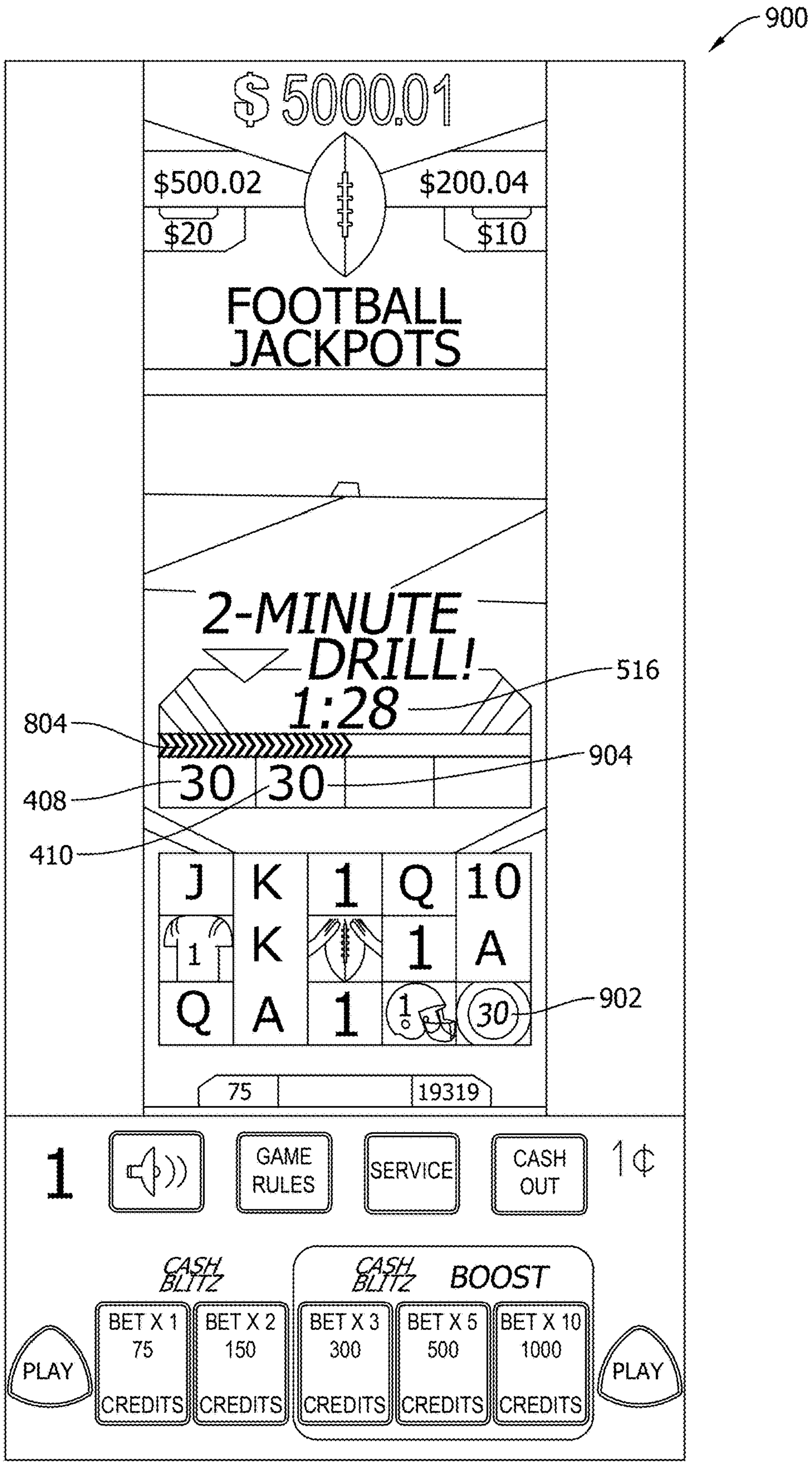
FIG. 9 is a next example screenshot in the sequence illustrating providing persistent outputs in electronic gaming, continuing the example shown in FIG. 8.

FIG. 9 is a next example screenshot 900 in the sequence for illustrating providing persistent outputs in electronic gaming, continuing the example shown in FIG. 8. As shown in screenshot 900, a COR symbol 902 is displayed and an output amount 904 associated therewith is added to win position 510. Timer 516 shows an updated time. Animation 804 is extended as adjacent win positions 508, 510 to now communicate that win positions 508, 510 both include output amounts therein.

Figure 10:
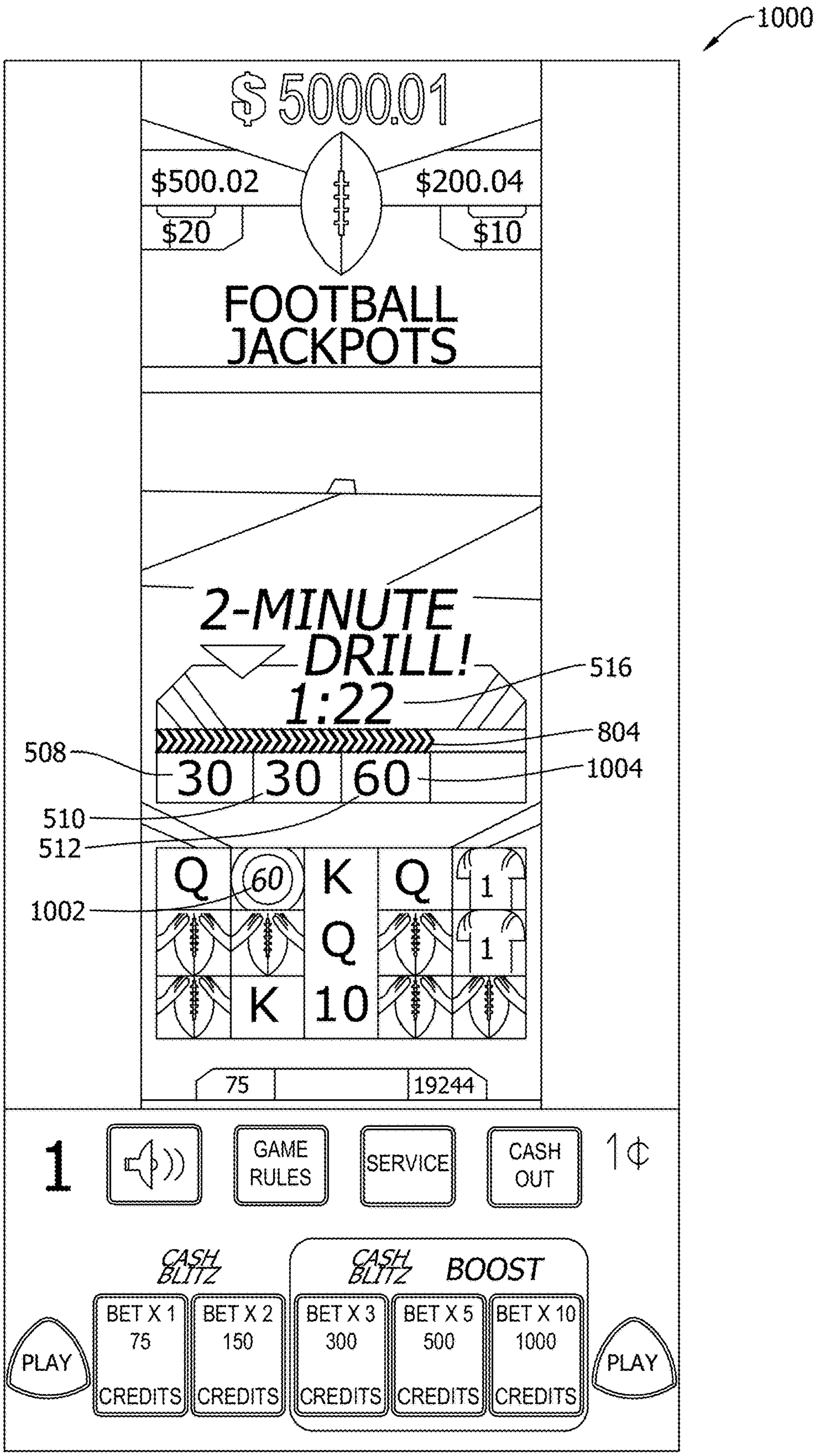
FIG. 10 is a next example screenshot in the sequence illustrating providing persistent outputs in electronic gaming, continuing the example shown in FIG. 9.

FIG. 10 is a next example screenshot 1000 in the sequence for illustrating providing persistent outputs in electronic gaming, continuing the example shown in FIG. 9. As shown in screenshot 1000, a COR symbol 1002 is displayed and an output amount 1004 associated therewith is added to win position 512. Timer 516 shows an updated time. Animation 804 is again extended as adjacent win positions 508, 510, 512 to now communicate that win positions 508, 510, 512 each include output amounts therein.

Figure 11:
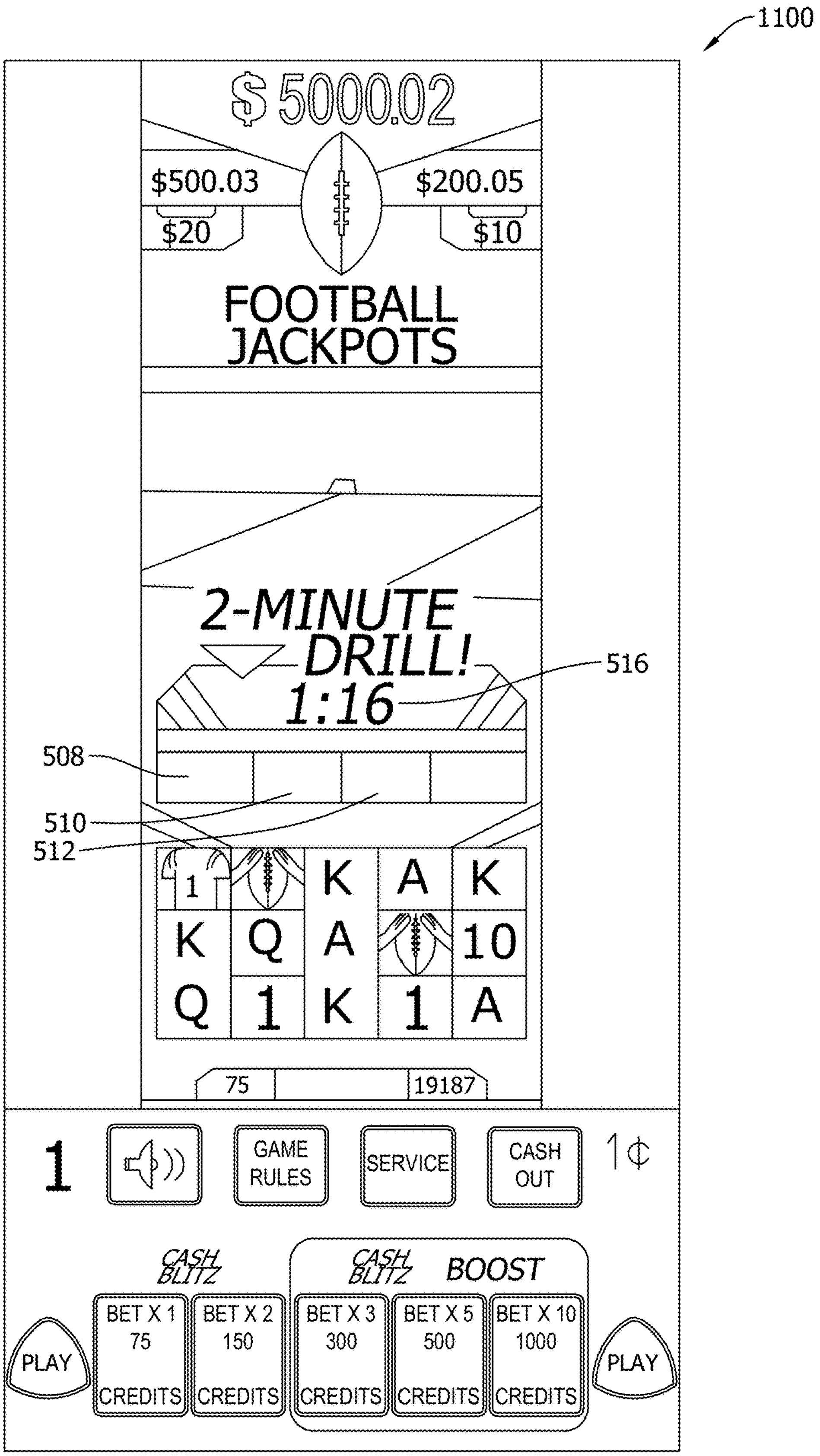
FIG. 11 is a next example screenshot in the sequence illustrating providing persistent outputs in electronic gaming, continuing the example shown in FIG. 10.

FIG. 11 is a next example screenshot 1100 in the sequence for illustrating providing persistent outputs in electronic gaming, continuing the example shown in FIG. 10. As shown in screenshot 1100, no COR symbols are displayed. Accordingly, win positions 508, 510, and 512 are reset to being blank (e.g., not including output amounts therein). Timer 516 continues to update (e.g., count down). Animation 804 is removed, to communicate that none of win positions 508-514 include output amounts therein.

Figure 12:
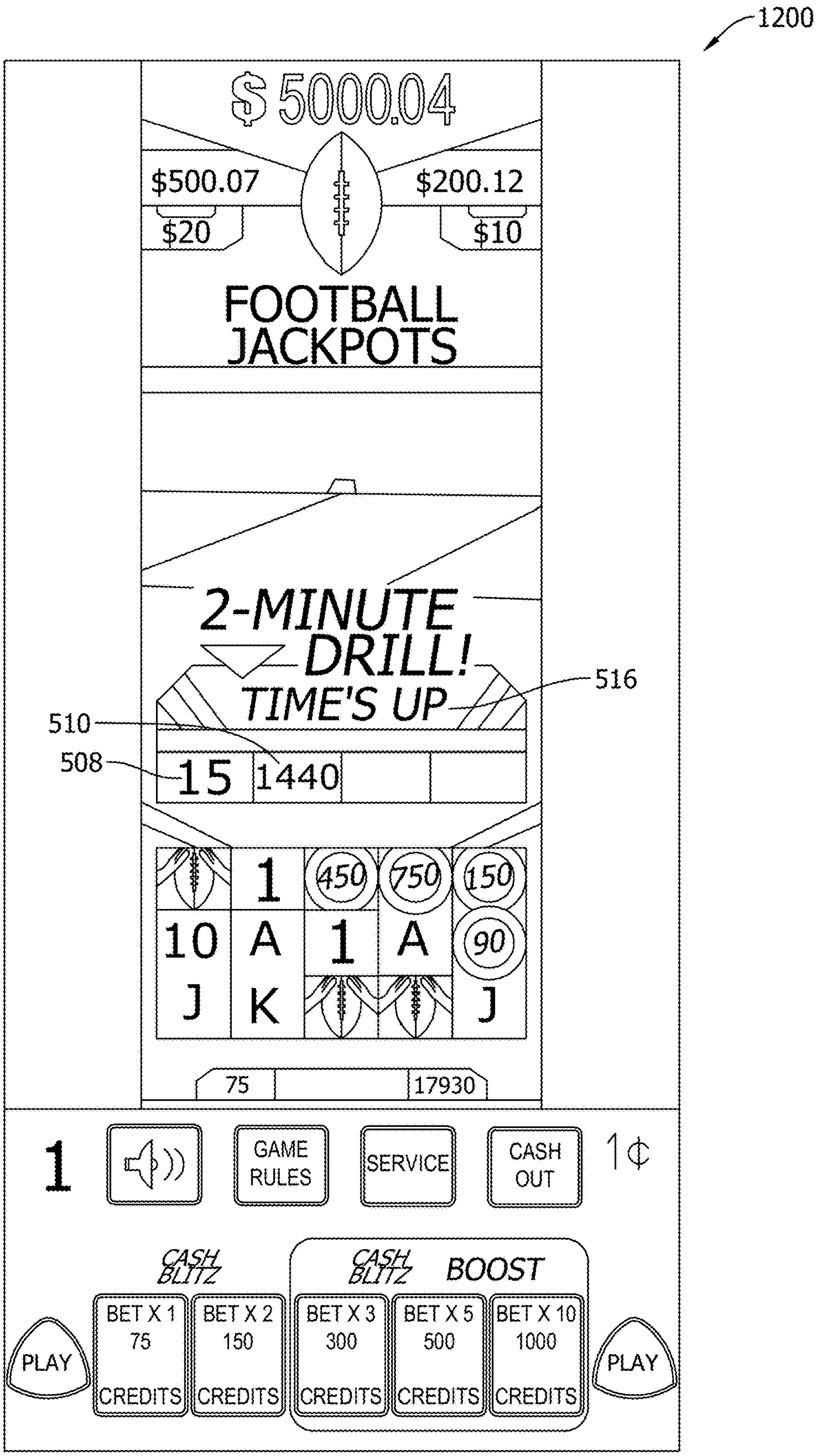
FIG. 12 is a next example screenshot in the sequence illustrating providing persistent outputs in electronic gaming, continuing the example shown in FIG. 11.

FIG. 12 is a next example screenshot 1200 in the sequence for illustrating providing persistent outputs in electronic gaming, continuing the example shown in FIG. 11. Timer 516 now displays "TIME'S UP" indicating that the two minutes have completed. In this example, only win positions 508, 510 are filled, so a bonus output of a sum of output amounts displayed at win positions 508-514 is not presented. Notably, during the feature game described herein pay line wins and/or other game wins may be presented as normal. However, in the example embodiment, bonus output amounts (e.g., associated with COR symbols) are only presented when all of win positions 508-514 are filled.

Figure 13:
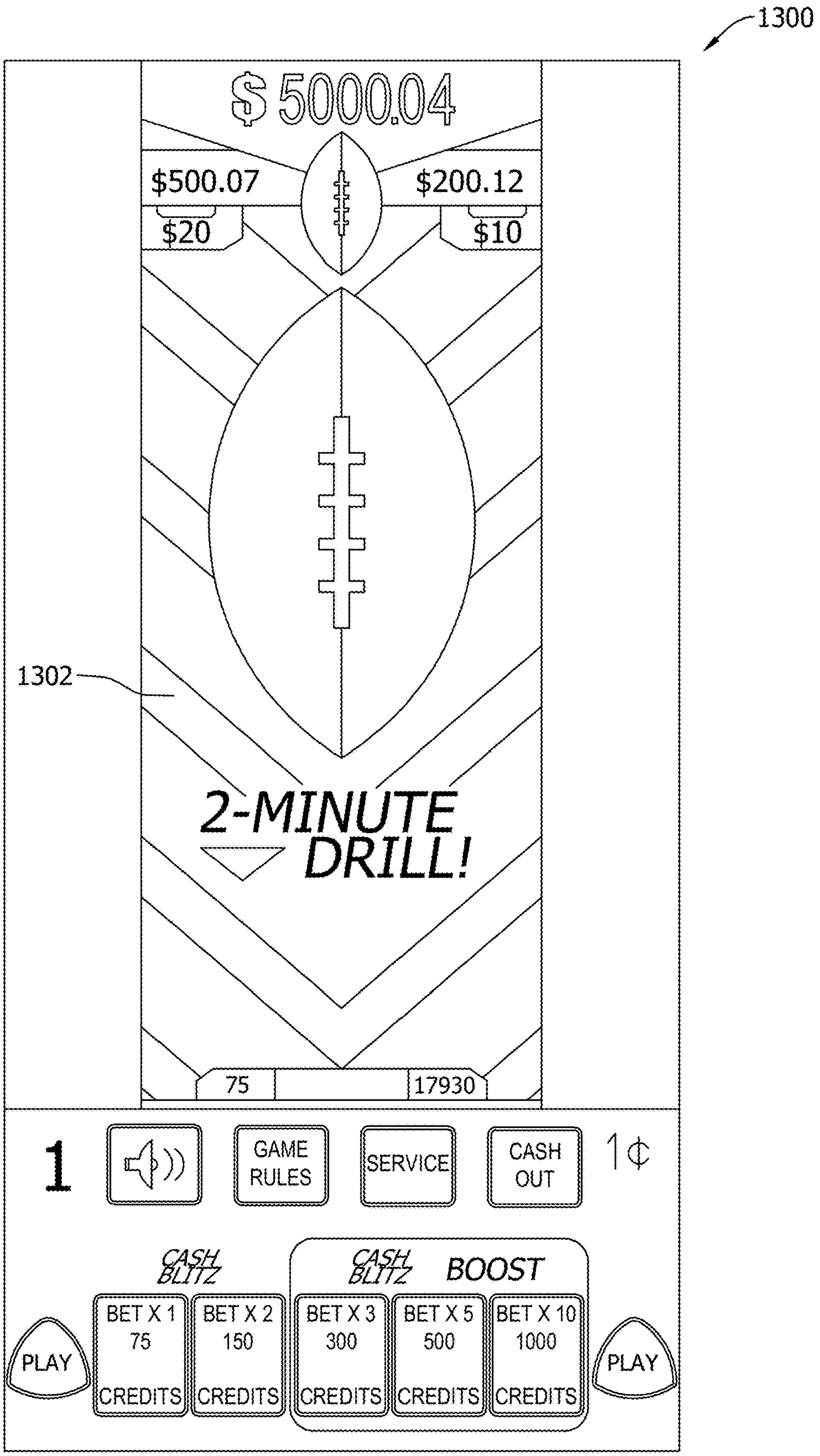
FIG. 13 is a next example screenshot in the sequence illustrating providing persistent outputs in electronic gaming, continuing the example shown in FIG. 12.

FIG. 13 is a next example screenshot 1300 in the sequence for illustrating providing persistent outputs in electronic gaming, continuing the example shown in FIG. 12. In screenshot 1300, a transition animation 1302 is displayed to indicate that the game is transitioning back from the feature game to the base game (e.g., as shown in FIG. 4). In some embodiments, animation 1302 may be displayed at the beginning of a sequence for the feature game (e.g., indicating the feature game has been triggered) in addition to and/or alternatively from indicating that the game is transitioning back from the feature game to the base game.

During play of the feature game described herein, different audio outputs (e.g., sounds) may be synchronized with various game outputs. For example, certain audio outputs may be synchronized with reel spins and/or stops and be associated with a theme of a game. For instance, a football game is described in the example embodiment herein. Accordingly, during reel spins and/or stops, different football-themed audio outputs may be presented (e.g., "in motion", "player in motion", "they're moving down the field"). Certain football-themed audio outputs associated with success in a football game may also be presented when certain symbols associated with output amounts are displayed, such as COR symbols (e.g., "nice completion", "wham, nice hit", "let's move those chains"). Some audio-outputs may also be synchronized with timer 516 (e.g., "one minute remaining", "2-minute drill has ended", a countdown from ten to one ("10, 9, 8, . . . 2, 1")). As explained herein, although the example embodiment is described with respect to a football theme, different themes are also envisioned. Accordingly, audio outputs may be associated with any theme of the game and include theme-specific sounds.

Figure 14:
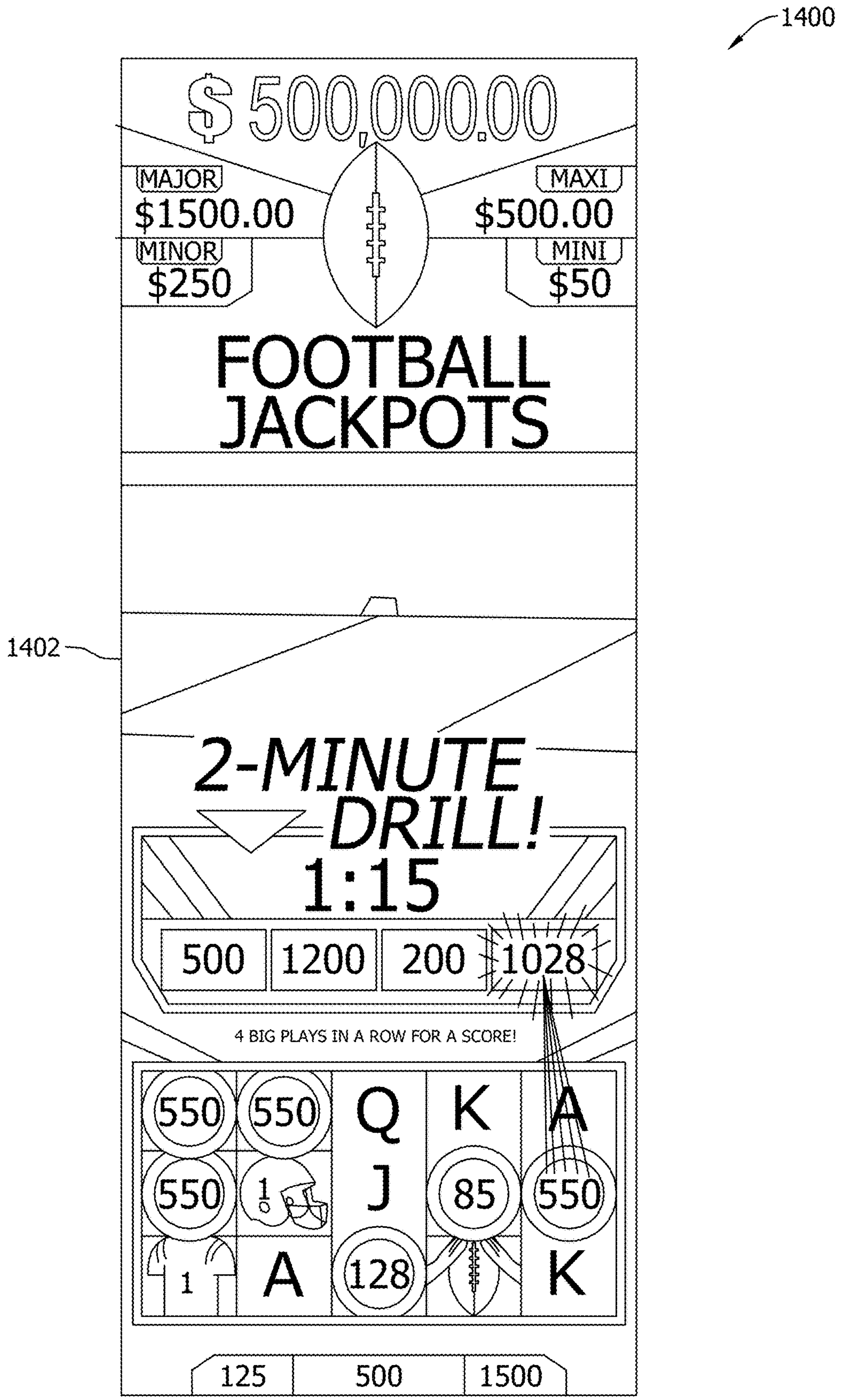
FIG. 14 is a screenshot illustrating an embodiment of providing persistent outputs in electronic gaming on a single display device, in accordance with the present disclosure.
Figure 15:
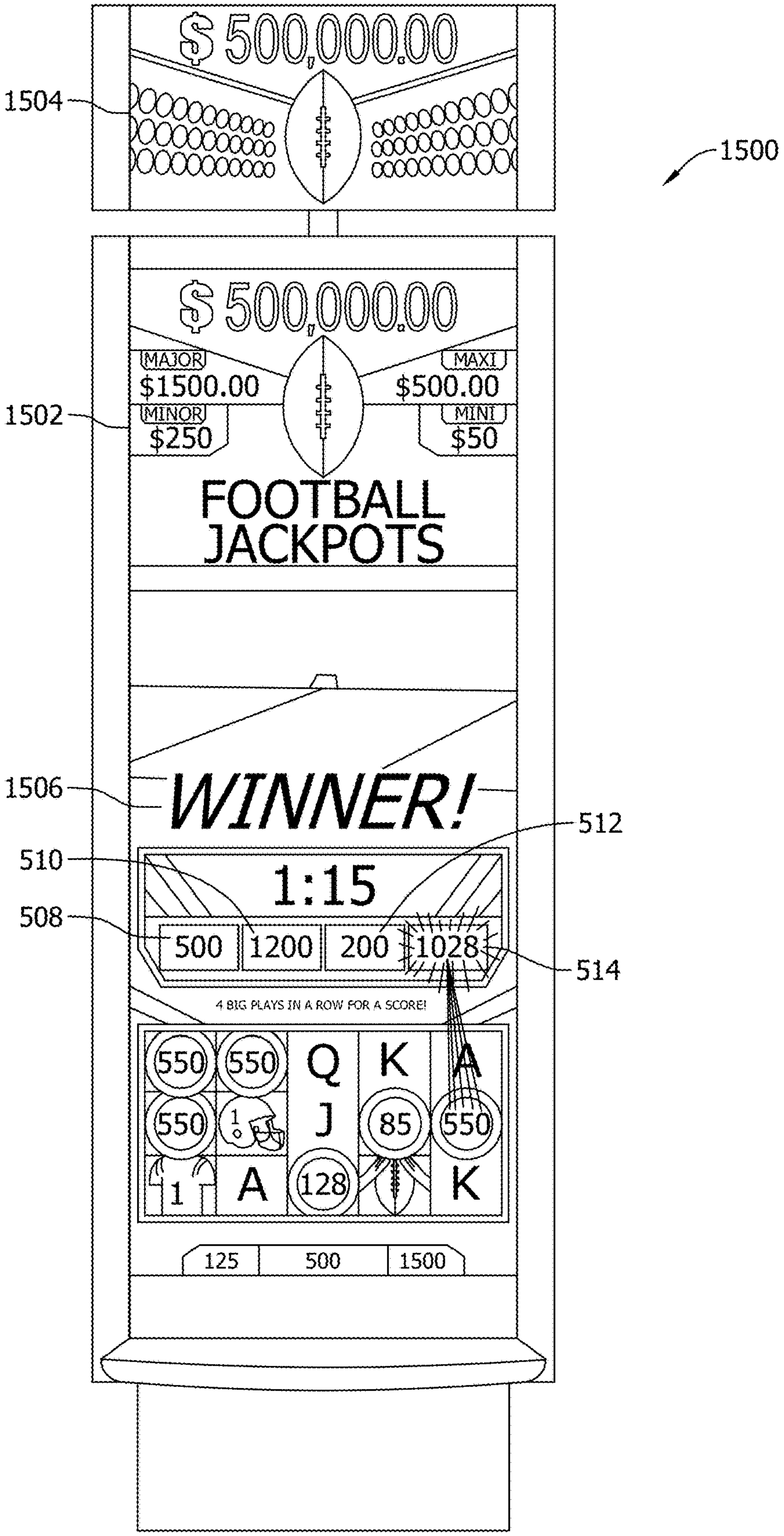
FIG. 15 illustrates another embodiment of the example illustration shown in FIG. 14, as shown on a plurality of display devices.

FIGS. 14 and 15 are a screenshots 1400, 1500 illustrating example embodiments, in accordance with the present disclosure. For example, screenshot 1400 includes the feature game described herein as being displayed on one display device 1402, while screenshot 1500 includes the feature game described herein as being displayed on multiple display devices 1502, 1504 (e.g., gameplay is displayed on device 1502 while jackpot information is displayed on device 1504. Further, in screenshots 1400, 1500, a "WINNER" animation 1506 is displayed because positions 508-514 are complete with output amounts. Accordingly, the sum of the output amounts in positions 508 will be presented (e.g., 500+1200+200+1028=2928 credits to be presented).

In various embodiments, one or more gaming devices may be experiencing a different bonus feature when the 2-minute drill timed feature is activated. In some of these embodiments, the gaming device will not activate the 2-minute drill feature and will wait for the existing feature to finish. If there is a predetermined amount of time left to play the 2-minute drill feature, then the 2-minute drill feature may be initiated on that gaming device.

In various embodiments, the 2-minute drill feature may be repeatedly activated at certain time intervals (e.g., after n minutes, where n ranges from 0 to a maximum value, for example 12). In various embodiments, each device may maintain its own individual timer. In various embodiments, the timer may be displayed even when the 2-minute drill feature is not active.

Figure 16:
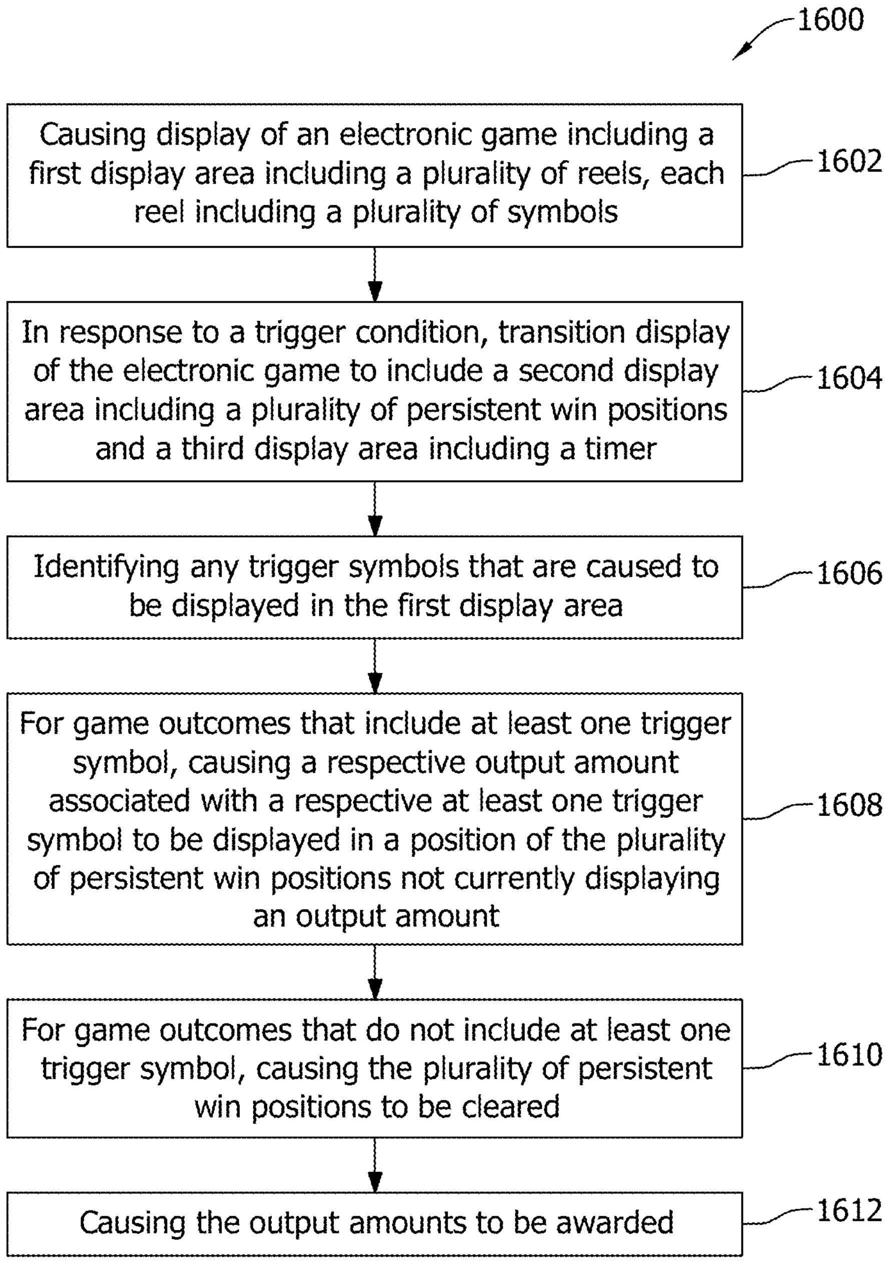
FIG. 16 illustrates an example method for providing persistent outputs in electronic gaming, as described herein.

FIG. 16 illustrates an example method 1600 for providing persistent outputs in electronic gaming, as described herein. In the example embodiment, method 1600 includes causing display 1602 of an electronic game including a first display area (e.g., 502) including a plurality of reels (e.g., 504), a second display area (e.g., 506) including a plurality of persistent win positions (e.g., 508-514), and a third display area including a timer (e.g., 516). For example, each reel may include a plurality of symbols and in response to a trigger condition, display may transition to include the second display area and the third display area. Method 1600 also includes causing 1604 the timer to incrementally transition between a first time and a second time. As spins of the plurality of reels occur to produce game outcomes as the timer incrementally transitions between the first time and the second time for each spin of a plurality of spins that occur as the timer incrementally transitions between the first time and the second time), method 1600 includes identifying 1606 any trigger symbols (e.g., 602) that are caused to be displayed in the first display area. For game outcomes that include at least one trigger symbol, method 1600 includes causing 1608 a respective output amount associated with a respective at least one trigger symbol to be displayed in a position of the plurality of persistent win positions not currently displaying an output amount. For game outcomes that do not include at least one trigger symbol, method 1600 includes causing 1610 the plurality of persistent win positions to be cleared. Method 1600 also includes, when a predetermined number of positions of the plurality of persistent win positions include output amounts, causing 1612 the output amounts to be awarded.

In some embodiments, method 1600 includes causing display of the electronic game in response an occurrence of a trigger condition (e.g., a message from a progressive system server). In some embodiments, method 1600 includes, for the game outcomes that include at least one trigger symbol, causing the respective output amount associated with the at least one trigger symbol to be displayed in a position of the plurality of persistent win positions wherein the respective output amount comprises a sum of output amounts associated with the at least one trigger symbol.

In some embodiments, method 1600 includes, for the game outcomes that include at least one trigger symbol, causing display of an animation (e.g., 702) extending between at least one symbol position on the plurality of reels including the at least one trigger symbol and the position of the plurality of persistent win positions not currently displaying an output amount.

In some embodiments, method 1600 includes causing display of a video associated with at least one historical event in a third display area. In some embodiments, method 1600 includes causing display of the video associated with the at least one historical event in the third display area, wherein the at least one historical event is associated with at least one of the first time or the second time.

In some embodiments, method 1600 includes causing display of an animation adjacent the second display area wherein the animation is dynamically displayed adjacent positions of the plurality of persistent win positions with output amounts therein and is not displayed adjacent positions of the plurality of persistent win positions with output amounts not displayed therein, thereby indicating a number of persistent win positions with output amounts therein.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. An electronic gaming system comprising:

at least one memory with instructions stored thereon; and at least one processor in communication with the at least one memory, wherein the instructions, when executed by the at least one processor, cause the at least one processor to:

cause display of an electronic game including a first display area including a plurality of reels, each reel of the plurality of reels comprising a plurality of symbols from a first set of symbols, the first set of symbols including triggering symbols that cause a bonus game to be triggered;

in response to a trigger condition, transition display of the electronic game to include a second display area including a plurality of persistent win positions and a third display area including a timer;

cause the timer to incrementally transition between a first time and a second time;

for each spin of a plurality of spins that occur as the timer incrementally transitions between the first time and the second time:

cause display of a respective plurality of symbols from a second set of symbols, the second set of symbols excluding the triggering symbols in order to prevent the bonus game from being triggered during the plurality of spins;

identify any trigger symbols that are caused to be displayed in the first display area;

for game outcomes that include at least one trigger symbol, cause a respective output amount associated with a respective at least one trigger symbol to be displayed in a position of the plurality of persistent win positions not currently displaying an output amount;

for game outcomes that do not include at least one trigger symbol, cause the plurality of persistent win positions to be cleared; and when a predetermined number of positions of the plurality of persistent win positions include output amounts, cause the output amounts to be awarded.

2. The electronic gaming system of claim 1, wherein the instructions further cause the at least one processor to receive a message from a progressive system server, wherein the message comprises the trigger condition.

3. The electronic gaming system of claim 1, wherein the instructions further cause the at least one processor to, for the game outcomes that include at least one trigger symbol, cause the respective output amount associated with the at least one trigger symbol to be displayed in a position of the plurality of persistent win positions, wherein the respective output amount comprises a sum of output amounts associated with the at least one trigger symbol.

4. The electronic gaming system of claim 1, wherein the instructions further cause the at least one processor to, for the game outcomes that include at least one trigger symbol, cause display of an animation extending between at least one symbol position on the plurality of reels including the at least one trigger symbol and the position of the plurality of persistent win positions not currently displaying an output amount.

5. The electronic gaming system of claim 1, wherein the instructions further cause the at least one processor to cause display of a video associated with at least one historical event in a third fourth display area.

6. The electronic gaming system of claim 5, wherein the instructions further case the at least one processor to cause display of the video associated with the at least one historical event in the third display area, wherein the at least one historical event is associated with at least one of the first time or the second time.

7. The electronic gaming system of claim 1, wherein the instructions further cause the at least one processor to cause display of an animation adjacent the second display area, wherein the animation is dynamically displayed adjacent positions of the plurality of persistent win positions with output amounts therein and is not displayed adjacent positions of the plurality of persistent win positions with output amounts not displayed therein, thereby indicating a number of persistent win positions with output amounts therein.

8. The electronic gaming system of claim 1, wherein the first set of symbols includes a first number of trigger symbols, wherein the second set of symbols includes a second number of trigger symbols, and wherein the second number is greater than the first number, thereby making it more likely for trigger symbols to be provided during the plurality of spins.

9. An electronic gaming device comprising:

at least one memory with instructions stored thereon; and at least one processor in communication with the at least one memory, wherein the instructions, when executed by the at least one processor, cause the at least one processor to:

cause display of an electronic game including a first display area including a plurality of reels, each reel of the plurality of reels comprising a plurality of symbols from a first set of symbols, the first set of symbols including triggering symbols that cause a bonus game to be triggered;

in response to a trigger condition, transition display of the electronic game to include a second display area including a plurality of persistent win positions and a third display area including a timer;

cause the timer to incrementally transition between a first time and a second time;

for each spin of a plurality of spins that occur as the timer incrementally transitions between the first time and the second time:

cause display of a respective plurality of symbols from a second set of symbols, the second set of symbols excluding the triggering symbols in order to prevent the bonus game from being triggered during the plurality of spins;

identify any trigger symbols that are caused to be displayed in the first display area;

for game outcomes that include at least one trigger symbol, cause a respective output amount associated with a respective at least one trigger symbol to be displayed in a position of the plurality of persistent win positions not currently displaying an output amount;

for game outcomes that do not include at least one trigger symbol, cause the plurality of persistent win positions to be cleared; and when a predetermined number of positions of the plurality of persistent win positions include output amounts, cause the output amounts to be awarded.

10. The electronic gaming device of claim 9, wherein the instructions further cause the at least one processor to receive a message from a progressive system server, wherein the message comprises the trigger condition.

11. The electronic gaming device of claim 9, wherein the instructions further cause the at least one processor to, for the game outcomes that include at least one trigger symbol, cause the respective output amount associated with the at least one trigger symbol to be displayed in a position of the plurality of persistent win positions, wherein the respective output amount comprises a sum of output amounts associated with the at least one trigger symbol.

12. The electronic gaming device of claim 9, wherein the instructions further cause the at least one processor to, for the game outcomes that include at least one trigger symbol, cause display of an animation extending between at least one symbol position on the plurality of reels including the at least one trigger symbol and the position of the plurality of persistent win positions not currently displaying an output amount.

13. The electronic gaming device of claim 9, wherein the instructions further cause the at least one processor to cause display of a video associated with at least one historical event in a third fourth display area.

14. The electronic gaming device of claim 13, wherein the instructions further cause the at least one processor to cause display of the video associated with the at least one historical event in the third display area, wherein the at least one historical event is associated with at least one of the first time or the second time.

15. The electronic gaming device of claim 9, wherein the instructions further cause the at least one processor to cause display of an animation adjacent the second display area, wherein the animation is dynamically displayed adjacent positions of the plurality of persistent win positions with output amounts therein and is not displayed adjacent positions of the plurality of persistent win positions with output amounts not displayed therein, thereby indicating a number of persistent win positions with output amounts therein.

16. At least one non-transitory computer-readable storage medium with instructions stored thereon that, in response to execution by at least one processor, cause the at least one processor to:

cause display of an electronic game including a first display area including a plurality of reels, each reel of the plurality of reels comprising a plurality of symbols from a first set of symbols, the first set of symbols including triggering symbols that cause a bonus game to be triggered;

in response to a trigger condition, transition display of the electronic game to include a second display area including a plurality of persistent win positions and a third display area including a timer;

cause the timer to incrementally transition between a first time and a second time;

for each spin of a plurality of spins that occur as the timer incrementally transitions between the first time and the second time:

cause display of a respective plurality of symbols from a second set of symbols, the second set of symbols excluding the triggering symbols in order to prevent the bonus game from being triggered during the plurality of spins;

identify any trigger symbols that are caused to be displayed in the first display area;

for game outcomes that include at least one trigger symbol, cause a respective output amount associated with a respective at least one trigger symbol to be displayed in a position of the plurality of persistent win positions not currently displaying an output amount;

for game outcomes that do not include at least one trigger symbol, cause the plurality of persistent win positions to be cleared; and when a predetermined number of positions of the plurality of persistent win positions include output amounts, cause the output amounts to be awarded.

17. The at least one non-transitory computer-readable storage medium of claim 16, wherein the instructions further cause the at least one processor to, for the game outcomes that include at least one trigger symbol, cause the respective output amount associated with the at least one trigger symbol to be displayed in a position of the plurality of persistent win positions, wherein the respective output amount comprises a sum of output amounts associated with the at least one trigger symbol.

18. The at least one non-transitory computer-readable storage medium of claim 16, wherein the instructions further cause the at least one processor to, for the game outcomes that include at least one trigger symbol, cause display of an animation extending between at least one symbol position on the plurality of reels including the at least one trigger symbol and the position of the plurality of persistent win positions not currently displaying an output amount.

19. The at least one non-transitory computer-readable storage medium of claim 16, wherein the instructions further cause the at least one processor to cause display of a video associated with at least one historical event in a third fourth display area.

20. The at least one non-transitory computer-readable storage medium of claim 16, wherein the instructions further cause the at least one processor to cause display of an animation adjacent the second display area, wherein the animation is dynamically displayed adjacent positions of the plurality of persistent win positions with output amounts therein and is not displayed adjacent positions of the plurality of persistent win positions with output amounts not displayed therein, thereby indicating a number of persistent win positions with output amounts therein.

* * * * *